Dec. 1, 1964  M. J. COHEN  3,159,159
FLUID WITHDRAWAL DEVICE AND CONTAINER
Filed Feb. 2, 1962  2 Sheets-Sheet 1

INVENTOR.
Milton J. Cohen
BY
Ooms, McDougall and Hersh
Attys

Dec. 1, 1964  M. J. COHEN  3,159,159
FLUID WITHDRAWAL DEVICE AND CONTAINER
Filed Feb. 2, 1962  2 Sheets-Sheet 2

INVENTOR.
Milton J. Cohen
BY
Ooms, McDougall and Hersh
Attys 3,159,159
FLUID WITHDRAWAL DEVICE AND
CONTAINER
Milton J. Cohen, 7325 16th St. NW., Washington 12, D.C.
Filed Feb. 2, 1962, Ser. No. 170,748
12 Claims. (Cl. 128—2)

This invention relates to a device for the withdrawal of fluid specimens and for the storage and dispensing thereof. It relates more particularly to a device for obtaining blood specimens from the human system and for the storage and dispensing thereof for testing and the like without the necessity for the removal of the obtained specimen from the device in which it is obtained thereby to avoid excessive handling and more contamination.

More specifically, this invention is addressed to a sealed container adapted to be employed with means for extraction to obtain a specimen of a fluid substance, such as an increment of fluid from the human system for testing and the like, and which may also be used as a container for the storage of the increment of fluid received therein thereby to avoid the usual practices of displacement from the extraction device into a storage container during which time the fluid may be exposed to contamination and the like, and which may also be employed in combination with means for dispensing the fluid from the container as required for one or more tests and the like thereby further to avoid exposure of the fluid to contamination from the time that it is extracted to the time that it is dispensed for testing or use.

In the past, use has been made of separate means for extraction, for storage and for dispensing whereby it became necessary to displace the fluid from the removal means into a vial for storage and from the storage vial into another means for dispensing. This has been especially true where it is desired to make available a number of measured increments of the extracted fluid for subsequent testing or use.

It is an object of this invention to provide an extraction means which obviates many of the objections which have been raised to prior processes and means for taking blood specimens.

More specifically, it is an object of this invention to provide a means which can be employed for taking samples of blood or other fluid; which is sturdy in construction and simple in operation for the removal of such samples of blood or fluid from the human system or the like; which embodies means for determining the proper placement of the device for the removal of the sample desired before the actual taking of the sample; which is formed of low cost and readily available materials which can be easily assembled into a low cost unit adapted either for single use or for multiple use in taking specimens; which can be used as a container for the storage of the sample and which maintains the material in a sealed relationship therein; which can be used also as a dispenser for the displacement of all or part of the obtained sample for testing or for other uses; which can be used as a disposable container, which embodies adaptor means for use with different holders and with different needles; which embodies means for controlling the rate of flow of fluid into and out of the container and the amount of fluid which is caused to flow into and out of the container; which houses the fluid in sealed relationship within the container while enabling processing of the fluid within the container such as agitation in conventional hospital or laboratory equipment to achieve uniform distribution of the fluid or materials adapted to be dissolved or dispersed therein; which is fabricated of elements that will not contaminate the fluid coming in contact therewith in the container, and it is a related object to provide needles and holders which can be used interchangeably with the containers of this invention to enable multiple use of the holders and needles with a plurality of such containers.

These and other objects and advantages of this invention will hereinafter appear and, for purposes of illustration, but not of limitation, embodiments of the invention are shown in the accompanying drawings, in which—

Figure 1:
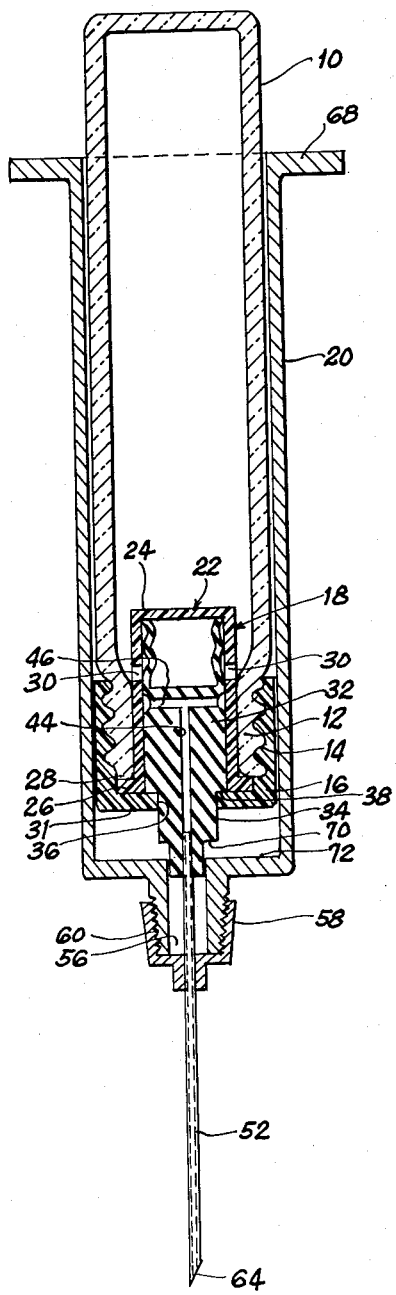
FIG. 1 is a schematic sectional elevational view of the device embodying the features of this invention with the needle housing attached and with the container located in normal position within an adaptor.
Figure 2:
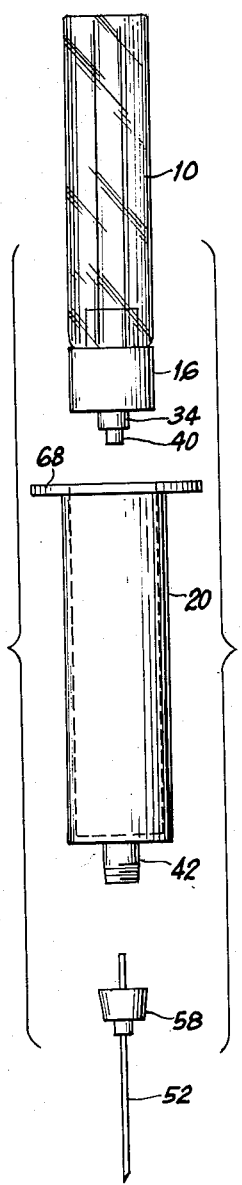
FIG. 2 is an elevational view of the separate elements shown in the assembly of FIG. 1.
Figure 3:
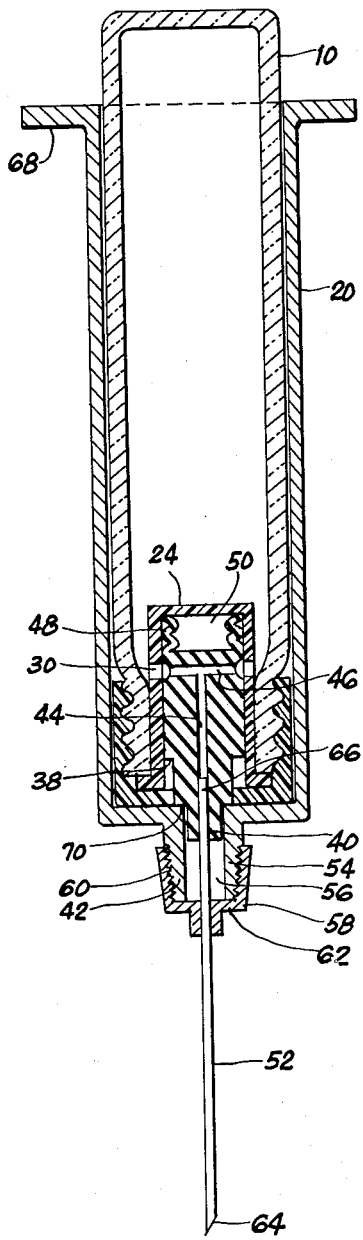
FIG. 3 is a sectional elevational view of the assembly shown in FIG. 1 but with the elements displaced to operative position for the withdrawal or for the dispensing of fluid into and out of the container respectively.
Figure 4:
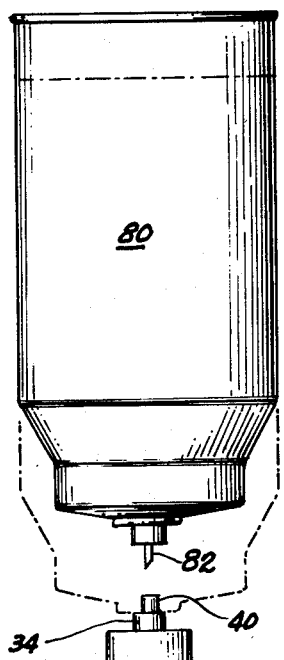
FIG. 4 is a schematic elevational view of the assembly shown in FIG. 1 in combination with a device for pressurizing the container for dispensing purposes.
Figure 5:
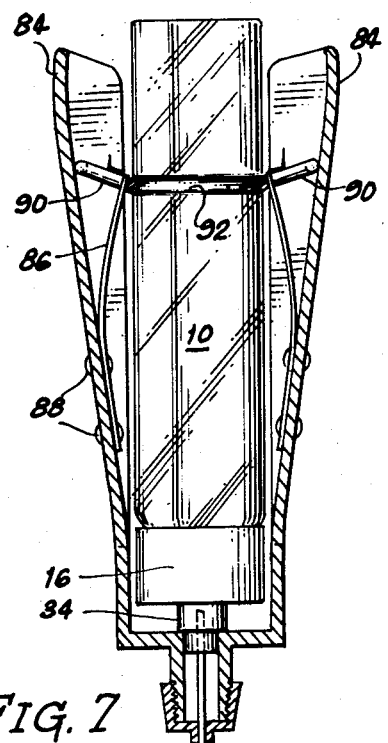
FIG. 5 is an elevational view partially in section of a modification of the device shown in FIG. 1 with the elements in the inoperative position.
Figure 6:
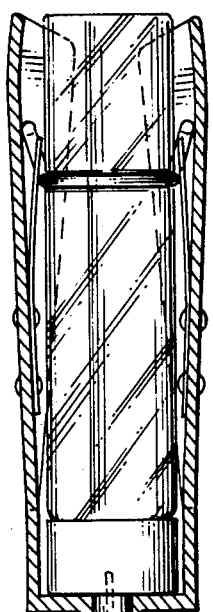
FIG. 6 is an elevational view similar to that of FIG. 5 showing the relationship between the elements when displaced to operative position.

Referring now to FIGS. 1–3 of the drawings, the numeral 10 indicates a vial or container having a neck 12 of smaller dimension with threads 14 on the outer wall for receiving a closure 16 in fitting relationship on the end thereof. The container is adapted to be fitted with a valve 18 which is responsive to endwise displacement of the container relative to a holder 20 between normal or retracted position, illustrated in FIG. 1, and operated position, illustrated in FIG. 3, whereby the valve is closed to seal the open end of the container, when in normal position, and open to permit communication with the interior, when in operated position. For this purpose, use can be made of various commercially available valves, such as is illustrated in my previously issued Patent No. 2,971,509 but, for purposes of sanitation and for purposes of maintaining a good sealing relationship to protect the fluid from leakage into and out of the container, and also to avoid contamination of the fluid by contact with corrosive metal parts and also to maintain a good sealing relationship, it is an important concept of this invention to make use of a valve structure of the type illustrated in FIGS. 1–6 of the drawings comprising a cup-shaped member 22 formed of plastic, glass or rubber-like material which is closed at one end by the wall 24 and which is provided with an outwardly extending skirt or flange 26 at the other end. The flange 26 is adapted to be received in sealing relationship between the lip 28 of the container and the wall 30 of the closure when the latter is turned down tightly onto the threaded end of the container. The cup-shaped cylindrical member 22 is preferably dimensioned to have a length greater than the length of the neck 12 of the container so that an end section of the cup-shaped member will extend freely into the container. The cup-shaped member is provided with one or more ports 30 in the side wall for communicating the interior of the cup-shaped member with the interior of the container. It will be understood that the ports 30 may be located closer to the mouth of the container when a sufficient spaced relationship exists between the wall of the cup-shaped member and the walls of the container for enabling the desired communication between the interiors thereof but it is preferred to dimension the cup-shaped member to be received in fitting relationship with at least a portion of the neck of the container to provide a stiffening support when used as a cylindrical section for reciprocal movement of a piston or plug 32 therein.

The piston or plug 32 comprises a solid section of plastic or other rubber-like or resilient material shaped to correspond with the interior of the cup-shaped cylindrical section to enable endwise displacement of the piston 32 between normal, sealing position shown in FIG. 1 to retracted or open position shown in FIG. 3. For this purpose the plug or piston 32 is adapted to be received in fitting relationship within the cup-shaped member to effect an extended sealing relationship between the adjacent side walls which prevents the free flow of gases or fluids therebetween. The piston is formed with an end portion 34 of smaller dimension which is adapted to extend through an opening 36 in the central portion of the closure. The extension of smaller dimension defines an annular shoulder 38 which is adapted to engage the portion of the closure 16 adjacent the opening 36 to function as a stop for the piston in normal or sealing position.

In the modification illustrated in FIGS. 1–6 the piston is formed with an integral portion 40 of still smaller dimension which extends forwardly of the portion 34. The extension is adapted to be received in sliding relationship within a cylindrical sleeve 42 of the holder 20 properly to guide the container during endwise displacement within the holder between normal and operated positions.

The plug or piston 32 is formed with a central passage 44 which extends lengthwise from the forward end to and into communication with a cross passage 46 which extends crosswise of the piston adjacent the rearward end portion thereof to provide a continuous passage communicating the interior of the container with the end of the piston when the crosswise passage 46 is displaced into crosswise alignment with the ports 30. The piston is constantly urged towards normal sealing position as by means of resilient feet 48 integral with the piston and extending rearwardly thereof into engagement with the wall 24 of the cup-shaped cylindrical member and which are dimensioned to have a length greater than the space between the base of the piston and the wall 24 of the cup-shaped member. It will be understood that instead of making use of such resilient feet forming a part of the piston, other means constantly urging the piston in the direction towards its normal sealing position may be employed, such as coil springs, leaf springs, air springs and the like, positioned in dimensioned relationship within the open space 50.

The holder 20 is provided with a means for replaceably supporting a hollow needle 52 in endwise alignment with the passage 44. For this purpose, the holder is provided with a neck portion 54 of smaller dimension having a central opening 56 into which the reduced end portion 40 of the piston is adapted slidably to be received. Means are provided on the periphery of the neck for mounting a needle adaptor 58 in position of use on the end of the holder. For this purpose, the periphery may be provided with threads 60 adapted threadably to receive a threaded cap 62 through which the needle extends to provide an outwardly extending piercing end portion 64 and an entrant portion 66 which extends rearwardly of the cap for a distance to enter the passage 44 of the piston when the cap is turned down onto the holder in position of use. Instead of threaded engagement for replaceably mounting the needle, use can be made of a neck and cap contoured to effect a frictional grip when telescoped one onto the other. The needle is dimensioned to be received in sealing relationship within the passage 44 of the piston 32 so as to provide direct communication therebetween.

Having described the basic construction of the device, reference will now be made to the utilization thereof in taking a blood sample from a human being. Normally the elements will be disposed in the position shown in FIG. 1 in which the plug or piston 32 is in its normal forward position within the container with the shoulder 38 bearing against the stop 31 in the form of the closure wall and with the crosswise passages 46 offset forwardly from the ports 30. Under such circumstances, the interior of the container will remain sealed so that a vacuum can be provided and maintained in the interior thereof.

When it is desired to take a sample, a needle is fitted onto the end of the holder and the container inserted into the holder with the shaft 66 of the needle in endwise alignment with the passage 44 and preferably extending a short distance therein for sealed communication therewith.

When the elements have been thus assembled, the assembly is ready for insertion of the needle into the vessel from which it is desired to take a sample or specimen of blood or other fluid. The container is then displaced forwardly relative to the holder as by means of the application of thumb pressure upon the base of the container while holding the flanges 68 at the base of the holder. When the container is displaced forwardly for a distance to bring the shoulder 70 into engagement with the front wall 72 of the holder, further forward movement of the container relative to the holder will cause rearward displacement of the piston 32 relative to the container whereby the crosswise passages 46 will be brought into crosswise alignment with the ports 30. When this occurs, the interior of the container will be in direct communication with the hollow needle whereby the vacuum in the container will be effective to withdraw fluid from the vessel for passage endwise through the needle into the communicating passages and into the container.

It is possible initially to effect communication for a short increment of time sufficient to draw a small sample of fluid to determine whether the needle has been properly placed. When confirmation has been secured, as by visual inspection through the container when transparent, the valve can again be displaced to operated position by the described endwise displacement of the container relative to the holder and held in such position until the amount of fluid desired has been drawn into the container. The withdrawal can be stopped at any time by relaxation of the finger pressure to enable the resilient means to return the piston for a distance sufficient to offset the crosswise passages 46 from the ports 30 thereby to seal off the interior of the container with the fluid entrapped therein.

It will be apparent from the foregoing that the flow of fluids will occur without contact with elements which might cause contamination, that is, the fluid does not come into contact with metal springs or the like elements which can be attacked by such fluids to cause contamination or the like.

The container 10 should be formed of a relatively rigid material, such as glass, plastics, metal or the like, but it is preferred to form the container of a clear substance such as glass or plastic, especially when it is desired visually to inspect the fluids which are drawn into the container. When formed of sufficiently low cost, vapor and fluid impermeable material capable of sterilization, the container may be considered as a single use or disposable container or the container can be disassembled after use for sterilization of the parts and then reassembled for additional uses.

It will be apparent further that a container of the type described is capable of maintaining a sealed relationship such that the fluid extracted can be retained within the container for storage or use thereby to avoid the additional operations of transfer of the withdrawn fluid to other vials for storage and thereby also to avoid the danger of contamination of the fluid by reason of such multiple handling and transfer. However, the assembly described may be adapted for use only to effect withdrawal of a fluid which is thereafter transferred to one or more other vials for storage and use.

If the container described is also used for sealed storage of the fluid, the container can be adapted to dispense the fluid without handling and without the danger of contamination by exchanging the vacuum conditions existing within the container by positive pressure. For this purpose, use is made of a separate pressurizing container 80, such as an aerosol can having a valve structure which is activated upon insertion of a needle 82 and which communicates with the interior of the container upon endwise displacement of the container relative to the holder until the piston is displaced to operated position. Under such circumstances, the pressurizing fluid or gas flows from the pressurizing container 80 through the needle 82 and the passages 44 and 46 into the fluid container to provide positive pressure. It is preferred to effect such interchange while the container is positioned upright so that the fluid will be in the bottom of the container and free of the inlet ports. It is also desirable to make use of a pressurizing fluid or gas which will have no effect on the fluid within the container.

Thereafter, when it is desired to dispense fluid from the containr, it is only necssary to insert the container into the holder and again displace the container endwise relative to the holder until the valve piston 32 is displaced to bring the crosswise passages 46 into communication with the ports 30 with the container in the inverted position whereby fluid will be forced by pressure from the container through the communicating passages and out of the opening in the forward end of the piston. A suitable hollow needle can be inserted for direction of the fluid flow. When the container is allowed to return from operated position within the holder, the passages will become sealed to discontinue further fluid flow. Thus a number of increments of fluid can be dispensed without contamination or all of the fluid can be dispensed in a single operation. In the modification illustrated in FIGS. 5 and 6 means are provided to effect displacement of the container relative to the holder merely by pinching the holder between two or more fingers or while being held in the palm of the hand. For this purpose, the holder is provided with a pair of flexible legs 84 disposed on opposite sides of the container 10. Each leg is provided with resilient means, such as a curvilinear leaf spring 86, having one end secured as by fasteners 88 to the leg while the opposite end engages the side wall of the container thereby constantly to urge the legs in the direction away from the container to provide a spaced relationship therebetween.

A positive gripping relationship is established between the outwardly displaced portions of the legs and the adjacent walls of the container whereby flexure of the legs to displace the end portions in a direction towards the container will operate to effect endwise displacement of the container relative to the holder towards operated position. Release of the legs will free the legs for return to their normal spaced position and release of the container for re-return from operated to normal position.

While reliance may be had upon friction to achieve the desired reaction to the flexing of the legs, a positive interconnection is preferably provided such as by means of the wire clips 90 which are received in fitting relationship within an annular groove 92 provided in the periphery of the container while the bail portions of the clips are pivoted onto portions of the legs spaced rearwardly from the groove.

Figure 7:
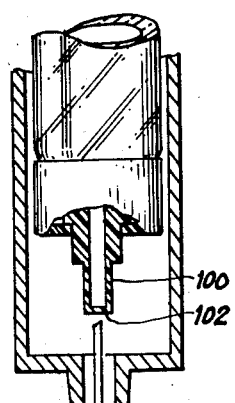
FIG. 7 is a sectional elevational view of the device showing a modification in the stem of the container.

In the modification shown in FIG. 7, the stem 100 of an aerosol type valve is in the form of a hollow tubular member having a sealing end wall 102 formed of a resilient plastic or rubber-like material which is capable of being pierced by the end of the needle when inserted therethrough for communication with the passages through the valve. When the end wall 102 is thus formed of a resilient material, a sealing relationship will be established between the outer periphery of the needle and the material forming the wall, as the needle is inserted therethrough, thereby to militate against the escape of blood or other fluid from the interior of the stem. Similarly, when the needle is withdrawn from communication with the container valve, the resilient material displaced when the wall 102 is pierced can return to establish an effective sealing relationship to prevent communication between the interior of the stem and the exterior to minimize contamination or to avoid the flow of blood or other fluid to the exterior of the stem and into the area between the stem and the holder.

It will be apparent from the foregoing that I have provided a new and novel device embodying a combination of elements which is adapted for more efficient and effective use in the withdrawal of blood specimens and the like fluid materials. It will also be apparent from the foregoing that the needle and the adaptor are capable of multiple use and interchangeable use with various containers thereby to provide for greater flexibility in the utilization of the device embodying the features of this invention.

It will be apparent also that the foregoing construction will greatly benefit the procedures as well as the sanitation in the procurement and use of blood specimens and the like since it will no longer be necessary to expose the specimens to the atmosphere or to excessive numbers of bodies since the specimen that is taken can be retained in sealed relationship within the container in which it is originally received for subsequent dispensing, testing and the like.

It will be understood that changes may be made in the details of construction, arrangement and operation without departing from the spirit of the invention, especially as defined in the following claims.

I claim:

1. A device of the type described comprising the combination of an elongate holder open at the opposite ends, an elongate container closed at one end and open at the other end and dimensioned slidably to be received within said holder and having a length approximately corresponding to the length of said container, a valve in communication with the open end of the container for maintaining a sealed relationship in the interior thereof and means within said valve for opening and closing the valve responsive to endwise displacement of the container relative to the holder said means comprising a cup-shaped member having ports in the side walls spaced inwardly from the other end thereof, a piston received in sealing relationship within said cup-shaped member and slidable endwise therein between a sealed position and an inner open position, stop means on the other end of the holder in position to be engaged by said piston when the container is displaced towards the other end relative to the holder whereby the piston is displaced in the opposite direction from normal to open position responsive to said endwise movement of the container relative to the holder, communicating passages in said piston including one passage which extends lengthwise from the other end portion thereof to a portion short of the opposite end thereof and a crosswise passage communicating with said lengthwise passage and which extends laterally in endwise alignment with the ports but offset towards the other end thereof when the piston is in normal position and in crosswise alignment for communication therewith when the piston is in operated position for communicating the interior of the container with the opening through the piston, means for stopping the piston within said cup-shaped member when in normal position, resilient means comprising feet formed integrally with said piston and engaging the end of said cup-shaped member for constantly urging said piston towards normal position.

2. A device as claimed in claim 1 in which the container is formed of a transparent, fluid and vapor impervious material.

3. A device as claimed in claim 1 in which the cup-shaped member comprises an elongate cylinder.

4. A device as claimed in claim 1 which includes a closure on the open end of the cylinder having an opening in the central portion thereof for the passage of a portion of the piston therethrough.

5. A device as claimed in claim 4 in which the cylinder is formed with an annular flange extending outwardly from the forward end thereof in position to be received between the closure and the lip of the container for establishing a sealing relationship therebetween.

6. A device as claimed in claim 4 in which the piston is formed with an integral portion of reduced dimension extending forwardly from the outer end thereof and dimensioned to extend through the opening in the closure thereby to form a shoulder between the extension and the piston which functions as a means for stopping the piston when in normal position.

7. A device as claimed in claim 1 in which the holder is formed with a forward end wall having an opening extending therethrough and in which the piston is formed with an extension of reduced dimension adapted to pass through said opening in the holder thereby to define a shoulder between the piston sections of variable dimension which engages the forward wall of the holder as the stop means to effect displacement of the piston from normal to operated position responsive to outer displacement of the container relative to the holder.

8. A device as claimed in claim 1 which includes means on the outer end of the holder for mounting a hollow needle in endwise alignment with the passage through the piston.

9. A device as claimed in claim 1 in which the combination includes a hollow needle, an adaptor mounting said hollow needle and means for mounting the adaptor in fixed position on the outer end portion of the holder with the needle in endwise alignment with the passage through the piston and wherein the needle is dimensioned to be received in sealing relationship within said passage when the adaptor is mounted in position of use on the holder.

10. A device as claimed in claim 1 in which the container is dimensioned to have a length greater than the length of the holder whereby the inner end portion of the container projects beyond the corresponding end portion of the holder for access thereto for actuation of the container relative to the holder between open and closed positions.

11. A device as claimed in claim 1 which includes means forming a part of the holder normally extending laterally in spaced apart relationship with the side walls of the container, an operative connection between said means and said container whereby the container is displaced lengthwise relative to the holder responsive to lateral displacement of said means, and resilient means constantly urging said means in the laterally spaced apart position.

12. A device as claimed in claim 1 including flange means extending outwardly at the end of said holder adjacent the inner end of said container, said flange means being adapted for engagement with the fingers of the user of said device, and wherein said container is dimensioned to have a length greater than the length of the holder whereby the inner end of the container projects beyond the adjacent end of the holder so that the container can be actuated when the fingers grip said flange portion.

References Cited by the Examiner

UNITED STATES PATENTS

| | | | |
|---|---|---|---|
| 1,019,207 | 3/12 | Ward | 128—218 |
| 2,095,622 | 10/37 | Wilson | 251—353 |
| 2,460,641 | 2/49 | Kieiner | 128—276 |
| 2,971,509 | 2/61 | Cohen | 128—216 |

RICHARD A. GAUDET, *Primary Examiner.*

JORDAN FRANKLIN, LOUIS R. PRINCE, *Examiners.*